(12) United States Patent
Allo et al.

(10) Patent No.: US 10,678,953 B1
(45) Date of Patent: Jun. 9, 2020

(54) SELF-CONTAINED KEY MANAGEMENT DEVICE

(71) Applicant: Seagate Technology LLC, Cupertino, CA (US)

(72) Inventors: Christopher Nicholas Allo, Lyons, CO (US); Saheb Biswas, Longmont, CA (US)

(73) Assignee: Seagate Technology LLC, Fremont, CA (US)

( * ) Notice: Subject to any disclaimer, the term of this patent is extended or adjusted under 35 U.S.C. 154(b) by 233 days.

(21) Appl. No.: 15/498,348

(22) Filed: Apr. 26, 2017

(51) Int. Cl.
*G06F 12/14* (2006.01)
*G06F 21/78* (2013.01)
*H04L 9/08* (2006.01)
*G06F 9/445* (2018.01)

(52) U.S. Cl.
CPC .............. *G06F 21/78* (2013.01); *G06F 9/445* (2013.01); *H04L 9/0877* (2013.01); *H04L 9/0897* (2013.01)

(58) Field of Classification Search
None
See application file for complete search history.

(56) References Cited

U.S. PATENT DOCUMENTS

| | | | |
|---|---|---|---|
| 6,950,523 B1 | 9/2005 | Brickell et al. | |
| 7,752,463 B2 | 7/2010 | Hahn et al. | |
| 7,877,603 B2 | 1/2011 | Goodman et al. | |
| 7,953,978 B2 | 5/2011 | Greco et al. | |
| 8,254,577 B2 | 8/2012 | Almoustafa et al. | |
| 8,295,490 B1 | 10/2012 | McCoy et al. | |
| 8,300,831 B2 | 10/2012 | Kahler et al. | |
| 8,411,863 B2* | 4/2013 | Ureche | G06F 21/80 380/277 |
| 8,474,698 B1 | 7/2013 | Billett et al. | |
| 8,494,170 B2 | 7/2013 | Kahler et al. | |
| 8,995,654 B2 | 3/2015 | Tang et al. | |
| 9,413,526 B1* | 8/2016 | Kothari | H04L 9/08 |
| 9,756,033 B2 | 9/2017 | Isozaki | |
| 2003/0041250 A1 | 2/2003 | Proudler | |

(Continued)

OTHER PUBLICATIONS

Ouellet, Seagate Secure Self-Encrypting Drives with LSI MegaRAID SafeStore Encryption Services for Servers, Product Brief, LSI, San Jose, CA, 2013, 3 pages. file:///C:/Users/CR%20Docket/Downloads/LSI-PB-Seagate-SED-SafeStore.pdf.

(Continued)

*Primary Examiner* — Venkat Perungavoor
(74) *Attorney, Agent, or Firm* — Setter Roche LLP; Kirk A. Cesari

(57) ABSTRACT

A local key management system can be implemented with a unified extensible firmware interface ("UEFI") basic input/output system ("BIOS"). The local key management system may be part of a removable data storage device that has a first secure area protected by a cryptographic module (e.g. hardware integrated circuit). The removable data storage device may also have a second secure area that stores a key to unlock a security enabled data storage device. The UEFI BIOS may be implemented to manage unlocking of security enabled data storage devices or data bands. The UEFI BIOS may also load a UEFI registration shell to manage registration of one or more security enabled drives or bands.

10 Claims, 11 Drawing Sheets

(56) References Cited

U.S. PATENT DOCUMENTS

| | | | |
|---|---|---|---|
| 2006/0143600 A1* | 6/2006 | Cottrell | G06F 21/572 717/168 |
| 2008/0065903 A1 | 3/2008 | Goodman et al. | |
| 2008/0147892 A1 | 6/2008 | Carlson et al. | |
| 2009/0327798 A1* | 12/2009 | D'Amato | G06F 3/062 714/4.1 |
| 2010/0111309 A1* | 5/2010 | Khatri | G06F 21/575 380/283 |
| 2011/0258456 A1 | 10/2011 | Lyakhovitskiy | |
| 2011/0261964 A1 | 10/2011 | Kahler et al. | |
| 2012/0099728 A1 | 4/2012 | Rich et al. | |
| 2012/0151199 A1* | 6/2012 | Shriver | G06F 21/575 713/2 |
| 2012/0239943 A1 | 9/2012 | Okamoto | |
| 2013/0024679 A1 | 1/2013 | Isozaki | |
| 2013/0067242 A1 | 3/2013 | Lyakhovitskiy et al. | |
| 2013/0232584 A1 | 9/2013 | Baentsch et al. | |
| 2014/0161251 A1 | 6/2014 | Yoshida et al. | |
| 2014/0237569 A1 | 8/2014 | Zhao et al. | |
| 2015/0006910 A1* | 1/2015 | Shapiro | G06F 12/1408 713/190 |
| 2015/0089209 A1* | 3/2015 | Jacobs | G06F 21/575 713/1 |
| 2015/0121028 A1 | 4/2015 | Gupta et al. | |
| 2016/0191481 A1 | 6/2016 | Zimmer et al. | |
| 2017/0012770 A1 | 1/2017 | Lin et al. | |
| 2017/0076096 A1 | 3/2017 | Challener et al. | |
| 2017/0083457 A1 | 3/2017 | Khemani et al. | |
| 2017/0085374 A1 | 3/2017 | Chen | |
| 2017/0177873 A1* | 6/2017 | Raghuram | G06F 21/53 |
| 2017/0244698 A1 | 8/2017 | Gale | |

OTHER PUBLICATIONS

Allo et al., "Removable Circuit for Unlocking Self-Encrypting Data Storage Devices", U.S. Appl. No. 15/214,965, filed Jul. 20, 2016, 39 pages.

Allo et al., "Removable Circuit for Unlocking Self-Encrypting Data Storage Devices", U.S. Appl. No. 14/862,128, filed Sep. 22, 2015, 38 pages.

Allo et al., "Systems and Methods for Unlocking Self-Encrypting Data Storage Devices", U.S. Appl. No. 15/436,712, filed Feb. 17, 2017, 45 pages.

Bradley, "Centrally Managing Access for Self-Encrypting Drives in Lenovo Systen x Servers", Mar. 2015, 198 pages.

Oasis, Key Management Interoperability Protocol (KMIP), May 2009, 22 pages.

Opal, "TCG Storage Security Subsystem Class; Opal", Aug. 2015. 80 pages.

* cited by examiner

SELF-CONTAINED KEY MANAGEMENT DEVICE

SUMMARY

In some embodiments, an apparatus can comprise a data storage device configured to connect to be removable from a first server. An unified extensible firmware interface ("UEFI") basic input/output system ("BIOS") stored locally in the data storage device can be loaded into the memory of the first server and executed at the first server. The UEFI BIOS configured to manage a secure access to an encrypted data storage device ("DSD") based on a first secure key. The UEFI BIOS can be configured to access a first secure storage area of the data storage device to retrieve information related to another drive coupled to the first server and to retrieve a second secure key from the first secure storage area. The UEFI BIOS can also be configured to access a second secure storage area of the data storage device based on the information, and retrieve the first secure key from the second secure storage area.

In some embodiments, a system can include a data storage device configured to be connectable and removable from a first server. The data storage device can include: an interface circuit, a first secure nonvolatile data storage area, a second secure nonvolatile data storage area separate from the first secure nonvolatile data storage area, a memory storing a key management module, and a controller. The controller can be configured to load the UEFI BIOS and the key management module into the memory of the first server. The key management module can be configured to: access a hardware encryption circuit of the first server; obtain access to the first secure nonvolatile data storage area of the data storage device via the hardware encryption circuit, retrieve a first access key from the first secure nonvolatile data storage area when access is granted to the key management module, utilize the first access key to access the second secure nonvolatile data storage area, retrieve a second access key from the second secure nonvolatile data storage area, and unlock an encrypted data storage device ("DSD") connected to the first server with the second access key.

In some embodiments, a memory device can store instructions that when executed cause a processor to perform a method. The method may include: loading a unified extensible firmware interface ("UEFI") basic input/output system ("BIOS") and a key management module from a removable storage device to a server memory; executing the UEFI BIOS at the server to unlock a self-encrypting drive (SED) attached to the server; executing the key management module at the server to access a local key management server (LKMS) on the removable storage device; receiving a key from the LKMS at the UEFI BIOS; and unlocking the SED based on the key.

DETAILED DESCRIPTION

In the following detailed description of the embodiments, reference is made to the accompanying drawings which form a part hereof, and in which are shown by way of illustrations. Features of the various described embodiments may be combined, other embodiments may be utilized, and structural changes may be made without departing from the scope of the present disclosure. Features of the various embodiments and examples described herein may be combined, exchanged, removed, other embodiments utilized, and structural changes made without departing from the scope of the present disclosure.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

In accordance with various embodiments, the methods and functions described herein may be implemented as one or more software programs running on a computer processor or controller. In accordance with various embodiments, the methods and functions described herein may be implemented as one or more software programs running on a computing device, such as a server, a data storage device (e.g. a solid state drive, a hard drive, a hybrid drive), or a combination thereof. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor to perform the methods.

Figure 1:
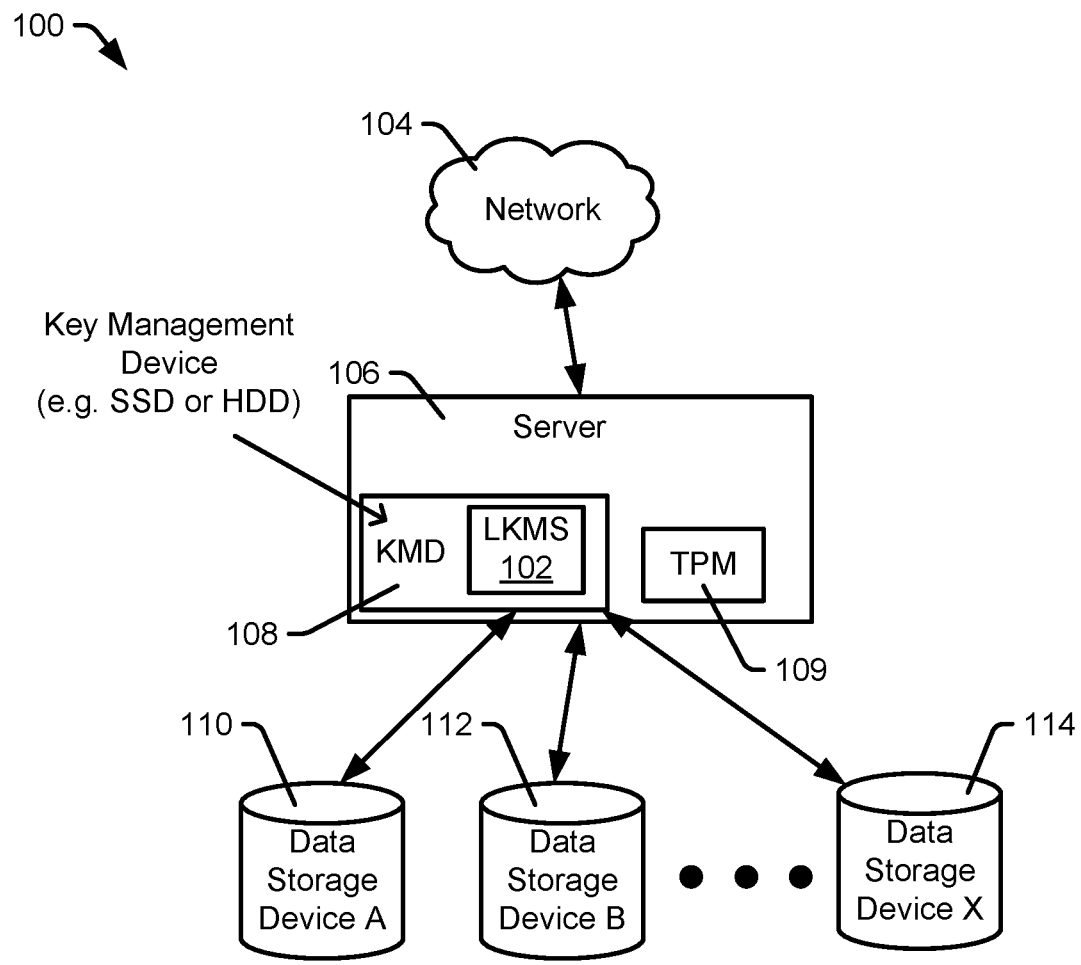
FIG. 1 is a diagram of a system of a self-contained key management device, in accordance with certain embodiments of the present disclosure.

Referring to FIG. 1, certain embodiments of a system of a stand-alone removable circuit for unlocking self-encrypting data storage devices are shown and generally designated 100. System 100 can include a local key management server ("LKMS") 102 that is locally part of a server 106 which can be connected to a network 104, which may be a wired or wireless network and may be any type of network. The server 106 may be a data server, file system server, metadata server, web server, application server, network attached storage (NAS), or other server. In some embodiments, the server 106 may include a redundant array of independent discs ("RAID") server. The server 106 may include a key management device ("KMD") 108, and may be coupled to one or more data storage devices ("DSDs"), such as DSDs A 110, B 112, and X 114. Further, the server 106 may include a trusted platform module ("TPM") 109 that can implement security protocols. The TPM 109 may be implemented as software, hardware, or a combination thereof such as security controller implementing firmware. In some embodiments, the TPM 109 may be a secure cryptographic integrated circuit ("IC") that is configured to manage user authentication, network access, data protection, or a combination thereof.

The DSDs A 110, B 112, and X 114, may be self-encrypting drives ("SEDs") and can be a solid-state drive ("SSD"), a hard disc drive ("HDD"), a hybrid drive, or a combination thereof. SEDs may encrypt data by itself, such as before data is stored to a storage medium (e.g. magnetic discs or flash memory) and decrypt the data as the data is retrieved from the storage medium. An SED may encrypt data with an internally stored encryption key that is not accessible outside of the SED, and may further decrypt encrypted data with a corresponding decryption key. In some examples, an SED's encryption key may be a symmetric key used by an SED's encryption engine to encrypt plaintext (i.e. data in transit) into cipher text (i.e. encrypted data) when the data is stored to the SEDs and to decrypt cipher text into plain text when data is read from the SEDs.

An SED may be said to be unlocked when a correct symmetric key (or other key combinations) has been provided, thus allowing the encrypted data to be decrypted. An SED may be said to be locked when the data remains encrypted and a correct symmetric key (or other key combinations) has not been provided. In some cases, an SED can become locked when power is removed to prevent an unauthorized person from taking the SED and accessing the data. In order to gain access to the encrypted data when power is restored, a correct access key must be provided to the SED.

In some embodiments, the KMD 108 may be a removable storage device, such as a HDD, SSD, or hybrid drive, which may also be an SED. The KMD 108 may include a first secure storage area configured or reserved to store unique identification keys for each of the DSDs A 110, B 112, and X 114. The server 106 may provide secure access to the first reserved storage area of the KMD 108 via utilizing the security protocols of the TPM 109. For example, the KMD 108 may not be able to access data (e.g. other access keys) in the secure reserved storage area until the TPM 109 provides the proper access protocol to the KMD 108.

Once the KMD 108 has access to the first reserved storage area, the KMD 108 may retrieve an access key to access a second secure reserved storage area of the KMD 108 to retrieve encrypted keys corresponding to DSDs A 110, B 112, and X 114 or corresponding to bands thereof. The KMD 108 may retrieve LKMS encrypted keys from the second reserved storage area that uniquely identify the drive(s) or band(s) that the server 106 wants to unlock. Once the KMD 108 receives the LKMS encrypted key(s), it may unlock the DSDs A 110, B 112, and X 114. For example, once DSD A is unlocked, thus giving the server 106 access to data in DSD A, the KMD 108 may delete the locally stored version of the encrypted key used to access DSD A.

In some examples, the KMD 108 may determine if there are any unregistered SEDs coupled to the server 106. Unregistered SEDs may be SEDs for which no encrypted key is stored in the LKMS 102. For example, if another DSD is coupled to the server 106, that DSD may be said to be unregistered if the LKMS 102 does not already have an encrypted key associated with the newly coupled DSD. To register unregistered DSDs, the KMD 108 may obtain a unique identifier for the unregistered DSDs, and provide the unique identifier to the LKMS 102. The LKMS 102 can create a unique security ID and a corresponding encrypted key associated with an unregistered DSD. The encrypted key can be stored on the LKMS 102, and the LKMS 102 may provide the security ID and the encrypted key to the KMD 108 upon request. The KMD 108 can lock the SED with the encrypted key. The security ID may be stored to the first secure storage area of the KMD 108, which the security ID may be part of a certificate (e.g. authentication key) that includes the security ID, and the first storage area can be secured by the TPM 109. The KMD 108 may then delete the local version of the encrypted key that was used to lock the corresponding SED. From that point on, the SED may be unlocked with the encrypted key stored in the LKMS 102, via the processes described herein. A certificate may be a digital document that may include an encrypted key, issuing authority, server name and client name, and other information.

In some embodiments, the KMD 108 may connect to be removable from the server 106 by physically and electrically connecting and disconnecting the KMD 108 to the server 106 without physically modifying the server 106. For example, the KMD 108 may be a data storage device that can connect via an interface to the server's 106 motherboard without physically modifying (e.g. moving, partially or wholly disassembling, disconnecting, etc.) components (e.g. mother board, graphics cards, processors, memory modules, expansion boards, DSDs, network adapters, power connectors, etc.) in the server 106. For example, to install the KMD 108 in the server 106, a user can simply select an available data storage device interface connection in a motherboard, attach a cable (if needed) with the connectors to the KMD 108 and to the motherboard. In some cases, connecting and disconnecting the KMD 108 in this manner can be accomplished without physically modifying a motherboard of the server 106. In some examples, the KMD 108 may be connected to other circuits in the server, such as an expansion card or memory bus. In some examples, the KMD may connect to be removable from the server 106 via intelligent drive electronics ("IDE"), serial advanced technology attachment ("SATA"), or another interface (e.g. SAS, NVMe, PCIe). Further, the KMD 108 may be removed from a server and connected to another server with little to no modification. The KMD 108 may be connected or disconnected from the server 106 when the server 106 is powered off or while the server 106 is still powered on.

In some examples, the KMD 108 may be located outside of the server's 106 physical enclosure, and may be physically connected and disconnected from the server 106 via an external interface without physically modifying the server 106. For example, the KMD 108 can connect to be removable from the server 106 via a serial bus, such as IEEE 1394, or another interface. In some embodiments, the KMD 108 can be a memory device that can connect to the server 106 via a USB interface, external serial advanced technology attachment ("eSATA"), or other interface. When the KMD 108 is connected to the server 106 via an external interface, the user can physically insert the KMD 108 into the appropriate interface directly or with interface cables. The KMD 108 may receive power from the server 106, or may be powered with a separate power supply. To remove the KMD 108 from the server 106, a user may physically remove the KMD 108 from the corresponding interface in the server 106. The user can reconnect the KMD 108 to the server 106 or optionally connect the KMD 108 to another server.

Figure 2:
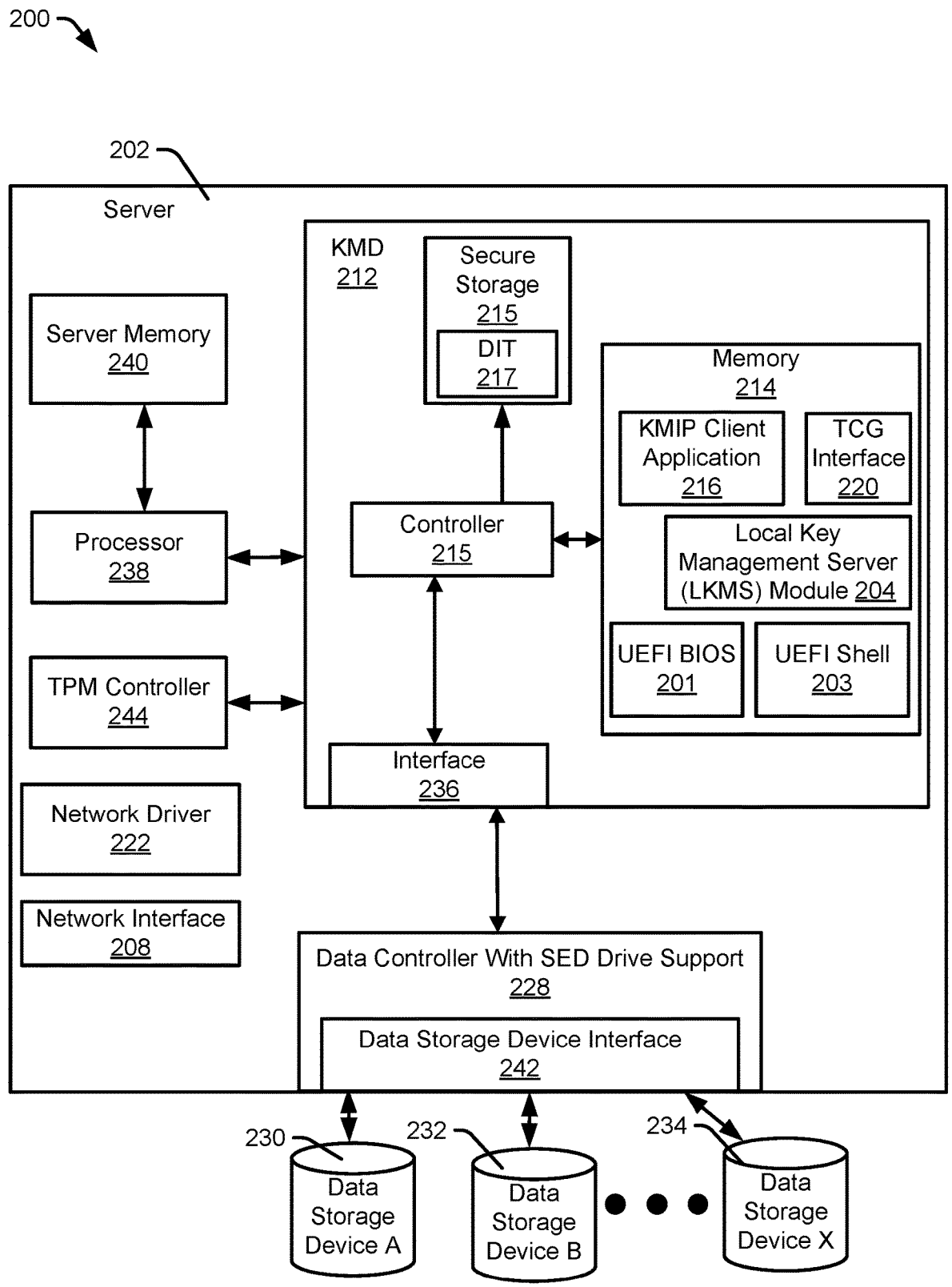
FIG. 2 is a diagram of a system of a self-contained key management device, in accordance with certain embodiments of the present disclosure.

Referring to FIG. 2, certain embodiments of a system of a stand-alone removable circuit for unlocking self-encrypting data storage devices are shown and generally designated 200. The system 200 may be an example of the system 100, according to certain embodiments. The system 200 may have a LKMS module 204 that includes a control circuit, software, secure storage area, or any combination thereof to perform the functions described herein.

The server 202 may be coupled to DSD A 230, DSD B 232, and DSD X 234 via data controller 228. In some examples, DSDs A 230, B 232, and X 234 may be SEDs, and may be coupled to the data controller 228 via a DSD interface 242. The DSD interface 242 may be a serial-advanced-technology interface ("SATA"), serial-attached small-computer-system-interface ("SAS"), or other interface. The controller 228 may be a redundant array of independent discs ("RAID") controller or other data storage controller.

The server 202 can also include a server memory 240, network driver 222, processor 238, and TPM controller 244. In some examples, the processor 238 may be a circuit including one or more processing devices, such as central processing units, microprocessors, or other processors. The controller 244 may be a controller with trusted computing group ("TCG") standardized passthrough protocol(s) to allow the controller 244 to securely communicate with the KMD 212 and to perform TCG operation(s).

The KMD 212 may be a removable data storage device, such as a hard disc drive (HDD) or solid state drive (SDD), connected to the server 202, which, in some examples, may be implemented as a PCIe card. The KMD 212 may include a memory 214 and a secure data storage area 215, both of which may be non-volatile memory, where secure data storage area 215 can be accessed via the TCG interface 220 in conjunction with the TPM controller 244. The memory 214 may store software modules (e.g. functions or commands), such as a unified extensible firmware interface ("UEFI") basic input/output system ("BIOS") module 201 or UEFI registration shell module 203, that can be loaded into the server memory 240 for execution of the functions and commands to unlock, register, or perform other functions on SEDs connected to the server, or in communication with, the server 202. The UEFI BIOS module 201 or UEFI shell module 203 can be loaded into the memory 240 via the controller 215 providing the UEFI BIOS module 201 or UEFI shell module 203 to the processor 238 for loading into the memory 240.

The secure data storage area 215 can include a drive information table ("DIT") which can store information regarding SEDs managed by the security protocols of the server 202. The secure storage area 215 may be a reserved band or zone of the KMD 212 reserved to store authentication keys and other information corresponding to SEDs connected to the server 202. The secure storage area 215 may be encrypted and may only be accessible by the KMD 212 when the proper key is provided to the KMD 212 by the TPM controller 244.

The TCG interface 220 can allow the controller 215 to communicate with the TPM controller 244, which can allow the controller 215 to unlock the secure storage area 215. The key manager interface protocol (KMIP) client application 221 can be loaded into the server memory 240 and executed by the processor 238 to allow the processor 238 to communicate with the LKMS module 204, which may be executed by controller 215 or another controller within the KMD 212.

During operation, the server 202 may be powered on, and the BIOS of the server 202 can be configured to load the UEFI BIOS 201 from the KMD 212 into the server memory 240 for execution by the processor 238. The UEFI BIOS 201 can be loaded prior to a native operating system of the server 202 being loaded. Once the UEFI BIOS 201 is finished running its security protocols or other functions, such as to unlock or modify security of a band(s) or drive(s), the server BIOS may load the native operating system which allows the server 202 to perform its normal functions. The BIOS code and the native operating system code may be stored in a non-volatile memory of the server.

Once the UEFI BIOS 201 is loaded into the server memory, the UEFI BIOS code can be executed to manage the TPM controller 244 to unlock the secure storage area 215 of the KMD 212. Access to the secure storage area 215 can be gained by utilizing the TPM controller 244 to generate or retrieve an access key to unlock the secure storage area 215. Once access to the secure storage area 215 is granted by the TPM 244, the UEFI BIOS 201 may retrieve the DIT 217 and, then or at a later time, an access key for the LKMS 204. In some examples, the DIT 217 can include a list of DSDs connected (physically or communicatively) to the server 202 and can include a registration status (e.g. registered or unregistered) of each DSD, or other information corresponding to the DSD. Further, the DIT 217 can include a list of protected bands (e.g. zones) on one or more DSDs; and the functions herein can be performed per drive or per band. A protected band may be a reserved portion of the available storage in a DSD. Each DSD may have one or multiple bands for data storage. When referring to security locking or unlocking of SED DSDs herein, a band may be utilized instead of the whole drive.

Once the UEFI BIOS 201 has the DIT 217, the UEFI BIOS 201 can determine if any other drives or bands need to be added to the DIT 217. The UEFI BIOS 201 can also access an encrypted key from the first secure storage area 215 to access the LKMS 204. The LKMS 204 can provide encrypted keys to access drives 230-234 or the bands listed in the DIT 217. The UEFI BIOS 201 can then receive the encrypted key and unlock a corresponding drive or band utilizing the encrypted key. The UEFI BIOS 201 can then delete the local version (on the server) of the encrypted key used to unlock the drive. Once all the drives are unlocked, the UEFI BIOS 201 may relock the secure storage 215 via the TPM 225 and then hand over control of the server 202 to the server BIOS to implement the native operating system.

In some embodiments, whenever an SED is connected or disconnected from the server 202, one or more unique indicators corresponding to the SED may be added or removed from the DIT 217. In some examples, the unique indicators may be manually added or removed from the list by a user, or may be automatically added or removed without any interaction with a user, or a combination thereof may be performed.

When one or more of the DSDs A 230, B 232, and X 234 have not been unlocked, the UEFI BIOS 201 may create an error indicator. In some cases, the UEFI BIOS 201 may create the error indicator when a threshold amount of time has passed since an encrypted key has been sent to a DSD, if an unlocked status indicator has not been received. The error indicator can be stored to a log file and can indicate which of the DSDs were not unlocked. The log file may be stored in the memory 214, server memory 240, secure storage 215, other memory, or any combination thereof.

In some examples, the KMD 212 can include UEFI Shell module 203 that can include one or more commands that can be loaded into the server memory 240 and executed by the processor 238; the commands can include commands to allow a user to add a drive or band or remove a drive or band from the DIT 217. When a command of the KMD 212 is to be executed, the DIT 217 may be retrieved and compared to the actual physical configuration of the system 202, or any other system the KMD 212 manages, to verify the components of the system. The DIT 217 can be updated based on changes to the system 202, or an error may be registered if any components cannot be verified. For example, the system can check for drive serial numbers, unique identifiers, encryption keys, or other information to detect if drives are in a different location or have been removed. In some cases, after UEFI BIOS 201 is closed once the KMD 212 setup or bootup process is finished, the KMD 212 commands can be available to be executed via the server 202 while the server 202 is running the native OS of the server.

Figure 3:
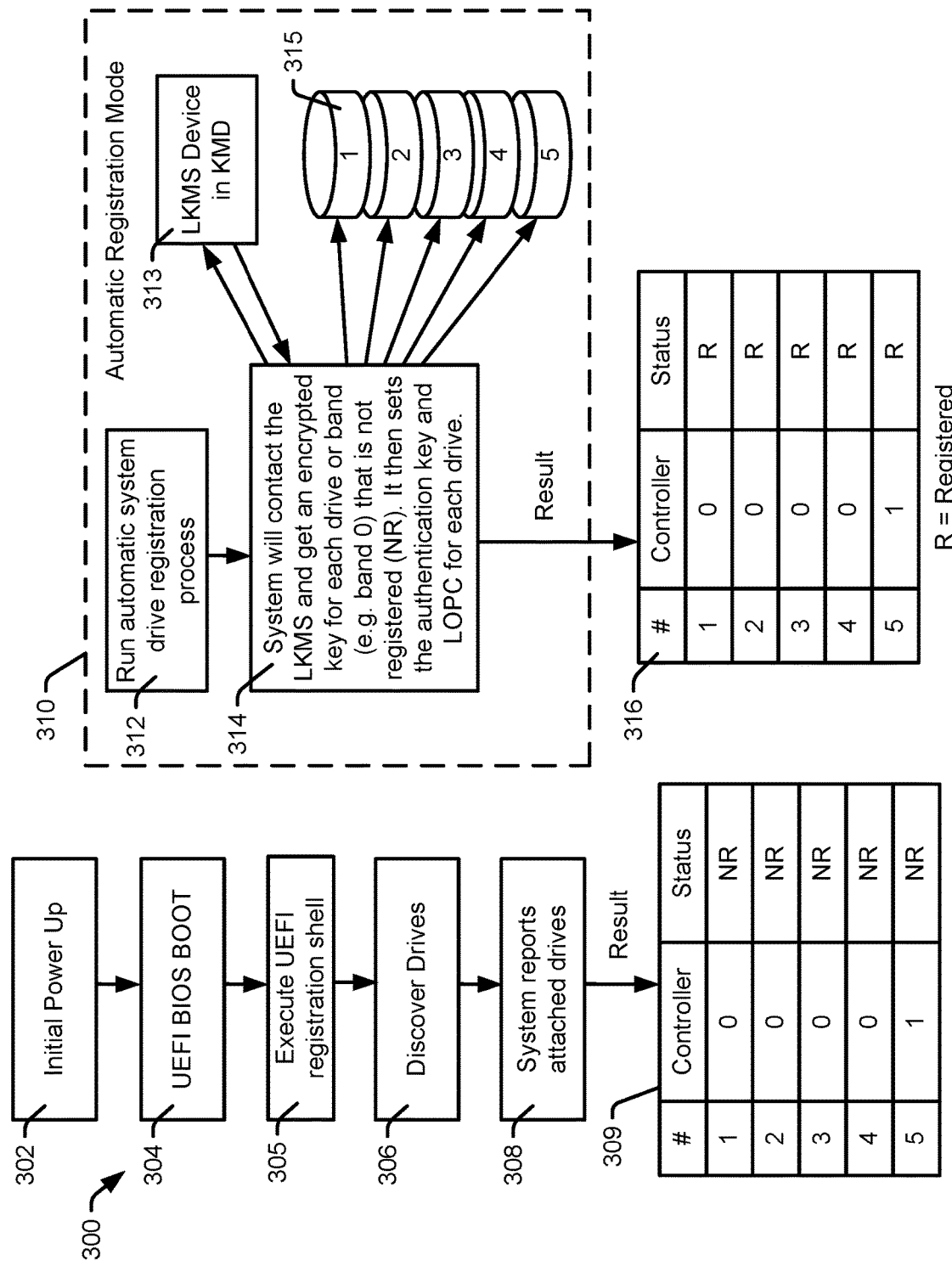
FIG. 3 is a flowchart of a method for a self-contained key management device, in accordance with certain embodiments of the present disclosure.

Referring to FIG. 3, certain embodiments of a method for unlocking stand-alone self-encrypting data storage devices with a removable device are shown and generally designated 300. The method 300 may be implemented by the systems 100 and 200, according to certain embodiments. Generally, the method 300 is a general overview of how systems, such as systems 100 and 200, can register DSDs 315, or bands thereof, with a LKMS device 313.

The method 300 may start when a server is initially powered on, at 302. The server may load the UEFI BIOS from the KMD to the server, at 304, load and execute the UEFI shell, at 305, and discover any SEDs or DSDs connected to the server, at 306. The UEFI BIOS 201 may report the connected drives to the KMD, at 308. The KMD may store or update the results of the reported drives in a drive information table ("DIT") 309 that may indicate whether the connected drives are registered or not registered. The DIT and updates to the DIT may be stored or updated to the memory 215. The DIT 309 may also store other information, such as an indication of which server data storage controller a drive is associated with. If needed, the system can create the DIT 309 if one does not exist. The DIT can be an internal table stored within the KMD that it is accessed via the UEFI BIOS utilizing security protocols as discussed herein.

If there are unregistered drives or bands, the server may implement an automatic registration mode, at 310, to perform an automatic drive registration process, at 312. The automatic registration mode may include the server system contacting the LKMS 313 to receive a key for each drive or band in the DIT 309 that is not registered, at 314. The automatic registration mode may then install the corresponding authentication key and lock-on-power-cycle ("LOPC") setting(s) to each drive, at 314. The result of the automatic registration mode can be stored in DIT 316.

A LOPC setting can be a setting within each separate physical drive that indicates a drive is to be locked when a power cycle event occurs, such that once power is restored the drive is locked. The LOPC setting can be done per whole drive, per protected band/zone, or another configuration. Further, the unlocking processes discussed herein may be utilized for a per band unlocking process, where there can be multiple bands per drive.

Figure 4:
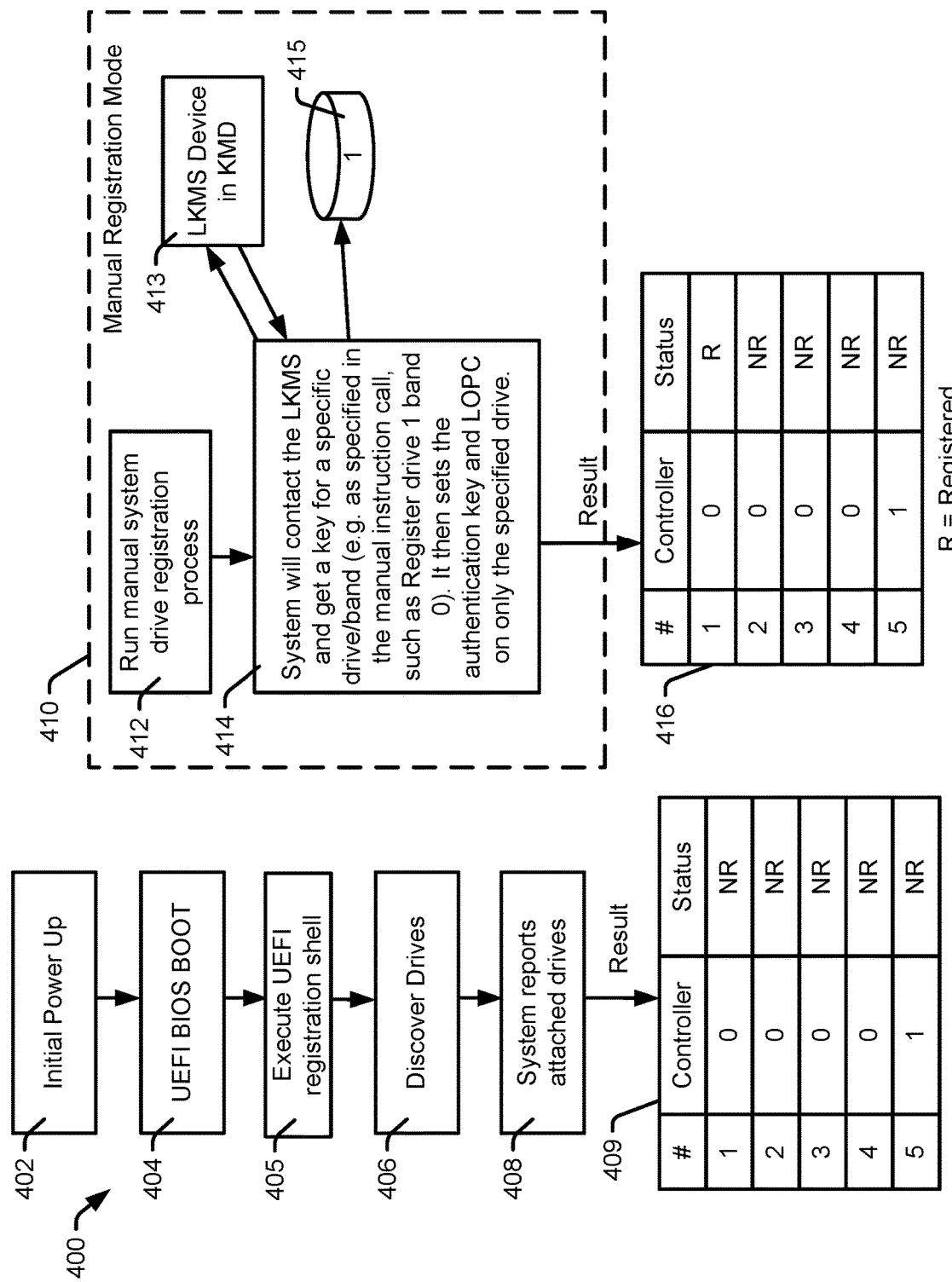
FIG. 4 is a flowchart of a method for a self-contained key management device, in accordance with certain embodiments of the present disclosure.

Referring to FIG. 4, certain embodiments of a method for unlocking stand-alone self-encrypting data storage devices with a removable device are shown and generally designated 400. The method 400 may be implemented by the systems 100 and 200, according to certain embodiments. Generally, the method 400 is a general overview of how systems, such as systems 100 and 200, can register one or more DSDs 415, or bands, with a LKMS device 413.

The method 400 may start when a server is initially powered on, at 402. The server may load the UEFI BIOS from the KMD to the server, at 404, load and execute the UEFI shell, at 405 and discover any SEDs or DSDs connected to the server, at 406. The OS may report the connected drives to the KMD, at 408. The KMD may store or update the results of the reported drives in a drive information table ("DIT") 409 that may indicate whether the connected drives, or bands thereof, are registered or not registered. The DIT and updates to the DIT may be stored or updated to the memory 215. The DIT 409 may also store other information, such as an indication of which server data storage controller a drive is associated with. If needed, the system can create the DIT 409 if one does not exist.

If there are unregistered drives or bands, the server may implement a manual registration mode, at 410, to perform a manual drive registration process, at 412. The manual registration mode may be initiated by a user or client of the server indicating a specific unregistered DSD or band in the DIT 409 should be registered. The server system can then contact the LKMS 413 to receive a key for the indicated drive or band, at 414. The manual registration mode may then install the corresponding authentication key and lock-on-power-cycle ("LOPC") setting(s) to the specific drive or band, at 414. The result of the manual registration mode can be stored in DIT 416.

Figure 5:
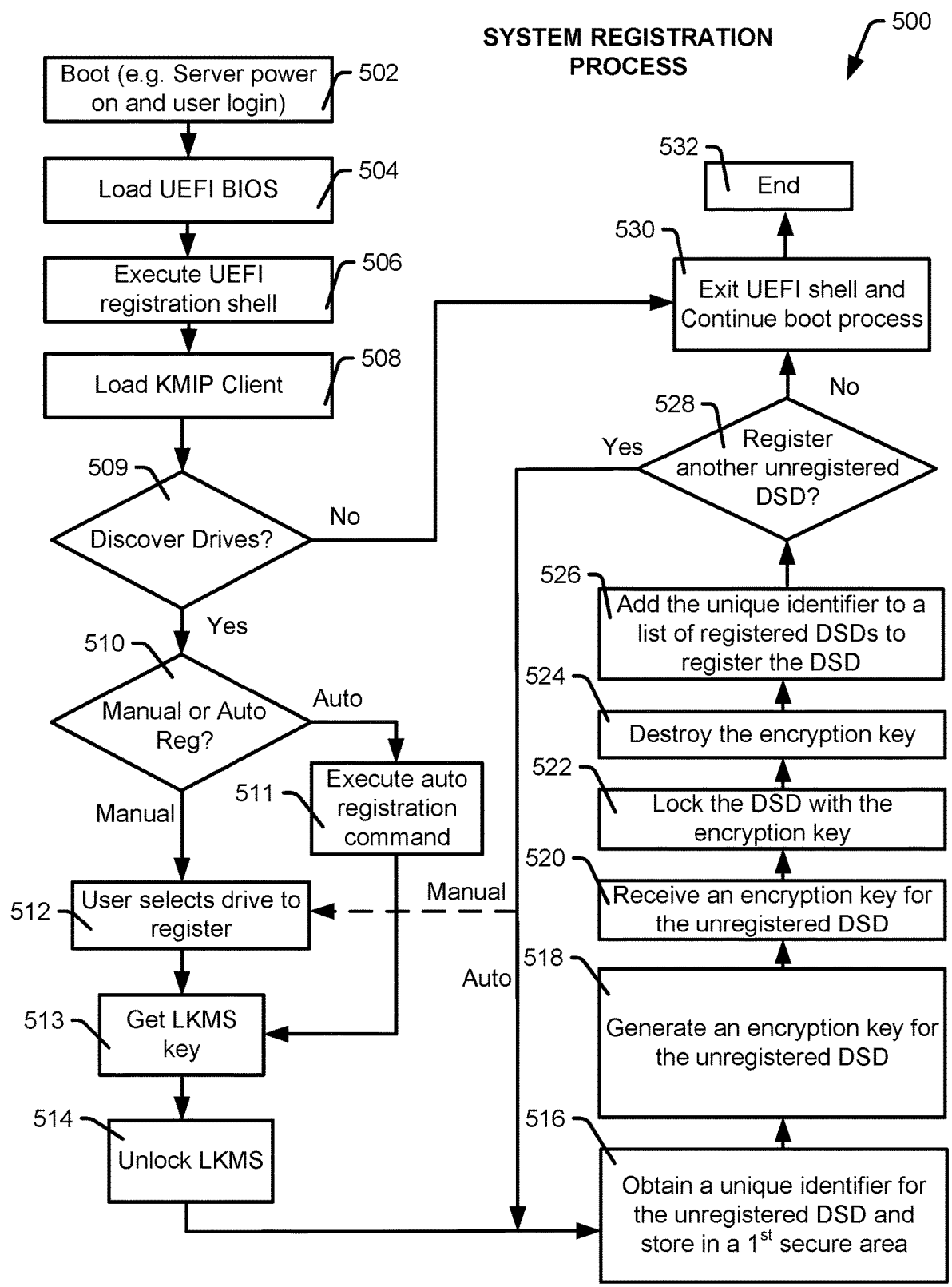
FIG. 5 is a flowchart of a method for a self-contained key management device, in accordance with certain embodiments of the present disclosure.

Referring to FIG. 5, certain embodiments of a method for unlocking stand-alone self-encrypting data storage devices with a removable circuit are shown and generally designated 500. The method 500 may be implemented by the systems 100 and 200, according to certain embodiments. The method 500 can initialize systems 100 and 200 and register DSDs with a LKMS device.

The method 500 can start when a server is powered on, at 502. Once the server is running, the server BIOS may load the UEFI BIOS from the KMD into the server memory, at 504, to allows functions for SEDs to be executed. When SEDs are to be registered, the UEFI BIOS can load and execute the UEFI registration shell, at 506, which may be a set of commands and functions that allow registration or deregistration of an SED. Registered means the SED, or a band thereof, is listed in a DIT of the KMD and has an associated encryption key managed by the LKMS to allow unlocking of the SED or band. A deregistered or unregistered SED, or a band thereof, may be listed in a DIT of the KMD but may not have an encryption key associated with it. If needed, the TPM may be utilized to create a secure storage area, such as a locked band, on a specific data storage device (e.g. SSD or HDD) designated as a KMD. The secure storage area can be utilized to store the DIT and other access keys. The KMIP client application may be loaded and executed, at 508, to allow the host processor to communicate with the LKMS module.

Once the UEFI BIOS and UEFI registration shell are loaded in the host memory, the method 500 can discover any drives or bands attached (directly or via network protocols) to the server and determine if there are any unregistered DSDs or bands connected, at 509. When there are no unregistered DSDs or bands that are to be registered, the process may exit the UEFI shell and UEFI BIOS and continue with the normal boot process, at 530, or can end at 532.

In some embodiments, unregistered DSDs or bands may be determined automatically by polling DSDs attached to the server and comparing their unique identifiers to a list of registered devices stored in a memory. When unique identifiers obtained from the DSDs are not in the list of registered devices, those DSDs or bands may be registered. In some cases, a user may determine that there are unregistered DSDs or bands coupled to the server. For example, when a user connects a DSD to the server via a DSD interface, the DSD, and bands thereof, may be unregistered.

When there are unregistered DSDs or bands attached to the server, the method 500 can include selecting whether an automatic registration mode or a manual registration mode should be used, at 510. When a manual registration mode is used, the process 500 can include allowing an operator or user of the server to select which drive(s) or band(s) to register, at 512, which may be done one at a time or multiple selected as a group, via the UEFI registration shell. When an automatic registration mode is utilized, the process 500 may execute an automatic registration command via the UEFI registration shell, at 511. The UEFI registration shell may provide the user or server a graphical user interface or programming interface to allow any selections to be made.

When one or more unregistered DSDs are to be registered, the method 500 can include loading a TPM storage interface into memory and unlocking a secure area of the KMD that stores a LKMS key, at 513, which can be retrieved from the first secure storage area. Utilizing the UEFI BIOS and the LKMS key, the method 500 can then unlock a second secure storage area that can store access keys associated with a DIT, at 514.

The method 500 may then obtain a unique identifier (e.g. serial number, or other identifier) for the unregistered DSD and store the unique identifier in the secure storage area of the KMD, at 516. The KMD may send a command to the respective SED requesting the unique identifier from the respective KED In some examples, the UEFI Bios via the server controller may send the command(s) to the respective SED.

The KMD may then generate an encrypted key corresponding to the unique identifier, at 518. The method 500 can include storing the encrypted key in the LKMS secure storage area, at 520. Once the encrypted key has been stored in the LKMS, the method 500 can include locking the DSD or band corresponding to the unique identifier with the encrypted key, at 522, which may be performed by the UEFI BIOS operating on the server. In some embodiments, the KMD may send a TCG command and the encrypted key to the SED with instructions to lock the SED or band with the encrypted key. A TCG command may be a command that conforms to trusted computing group (TCG) standardized protocols. The TCG command and the encrypted key can be transmitted to the DSD via a TCG interface. The command can include a request for an indicator to indicate if the lock operation was successful. If the lock operation was not successful, the command may be resent, aborted, or suspended pending action from the user. Also, an error message may be displayed and the error logged. The log can be stored to the KMD or another memory.

When the lock operation was successful, the local version of the encrypted key at the UEFI BIOS can be destroyed, at 524. For example, the encrypted key may be erased from the memory in which it was stored for access by the UEFI BIOS. The unique identifier may be added to a list of registered DSDs, such as a DIT, at 526. Once the unique identifier is added to the list of registered DSDs, the DSD can be considered registered and the successful lock operation can be store in the log.

The method 500 can include determining if there are other unregistered DSDs to register, at 528. This could be done automatically or done manually via user input. For example, unregistered DSDs may be determined automatically by polling DSDs attached to the server and comparing their unique identifiers to a list of registered devices stored in a memory. When there are more unregistered DSDs to register and the automatic registration mode has been implemented, the method 500 can repeat steps starting at 516. If the manual registration mode has been implemented, the method 500 may repeat steps starting at 512. Once all selected DSD have been registered, the method 500 may continue the boot process, at 530. In some examples, the boot process may include detecting or initializing other hardware components, loading applications into a memory, loading a native operating system into memory, other tasks, or any combination thereof. The method 500 can end once the UEFI BIOS hands over control of the server to the normal boot process, at 532.

One or more steps in the method 500 may be optional. For example, in certain embodiments, the step 510 may be removed and only one of the registration mode options implemented. Further, some ordering in which the steps are executed in the method 500 may be changed.

Figure 6:
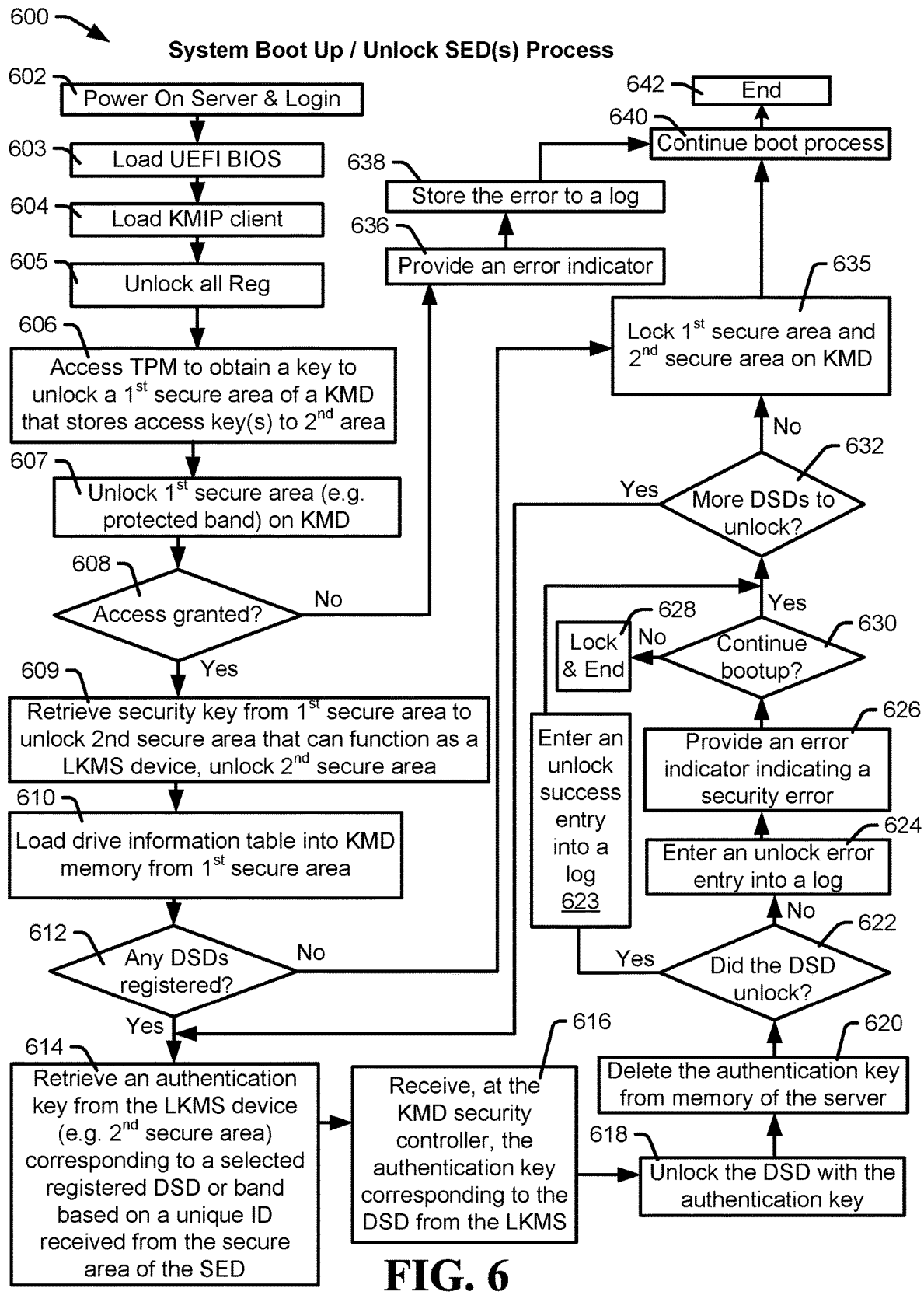
FIG. 6 is a flowchart of a method a self-contained key management device, in accordance with certain embodiments of the present disclosure.

Referring to FIG. 6, certain embodiments of a method for unlocking stand-alone self-encrypting data storage devices with a removable circuit are shown and generally designated 600. The method 600 may be implemented by the systems 100 and 200, according to certain embodiments. The method 600 can unlock DSDs using encrypted keys obtained from a LKMS.

The method 600 can include powering on a server, at 602, and having the server's BIOS load a UEFI BIOS into memory of the server, at 603. The UEFI BIOS may be configured to perform the security functions and communications herein and may be stored on a KMD. The UEFI BIOS may load a KMIP client into the server memory to allow a TPM of the server to communicate and access the LKMS, at 604, such as via TCG protocols. As part of the boot process, the UEFI BIOS may unlock all registered drives or bands listed in a DIT.

To unlock the drives or bands, the method 600 may include accessing a TPM within the server to obtain a key to unlock a secure area of the KMD that stores access key(s) (e.g. certificates) corresponding to SED(s). The secure area of the KMD may also store information to access a LKMS. Once the UEFI BIOS has access to TPM, the UEFI BIOS may utilize the TPM to unlock the first secure area on the KMD, at 607. If the TPM does not grant access to the secure area, at 608, the process may provide an error indicator, at 636, store the error to a log file, at 638, and may continue the boot process without unlocking any SEDs, at 640.

When access to the secure area of the KMD is granted, the UEFI BIOS may load the drive information table ("DIT") into the server memory, at 610, and the UEFI BIOS can determine if there are any DSDs or bands registered in the DIT, at 612. In some cases, unique identifiers obtained from connected DSDs can be compared against the list of registered DSDs to determine if there are any DSDs or bands in the DIT. If there are no DSDs registered in the DIT, the process may relock the secure areas of the KMD, at 635, and may continue with the boot process without unlocking any SEDs, at 640. However, if there are DSDs registered in the DIT, the process may continue.

When at least one of the unique identifiers obtained from the DSDs coupled to the server corresponds to a unique identifier in the list of registered DSDs, the method 600 can include retrieving a security key from the first secure area to unlock a second secure area that can function as a LKMS device, and then unlocking the second secure area, at 609. Once the second secure area is unlocked, the method 600 can include retrieving a security key (e.g. encrypted key) corresponding to a selected registered DSD or band, at 614, by its unique stored ID. Steps 609 and 610 can be swapped in order in which they happen based on system design choices.

The method 600 can include receiving the encrypted key corresponding to the selected unique identifier from the LKMS, at 616. When the encrypted key is received, the encrypted key may be stored to a memory. If the encrypted key is not received, a DSD corresponding to the encrypted key will not be unlocked, and an error message can be reported or logged.

The registered DSD or band corresponding to the encrypted key and the selected unique identifier may be unlocked by the encrypted key, at 618. The UEFI BIOS may also delete the local version of the encrypted key from the memory, at 620. In some embodiments, an area of the memory in which the encrypted key was stored may be overwritten with data patterns, such as a pattern of 0's or 1's, to erase the security key from the memory. Further, other secure ways of deleting an encrypted key may be utilized.

The method 600 can include determining if the DSD was successfully unlocked, at 622. In some examples, the UEFI BIOS can determine if the DSD was successfully unlocked based on the DSD's response to the unlock command. For example, a DSD can transmit a successful return indicator to the OS when the unlock command was successfully executed, and a non-successful return indicator to the OS when the unlock command was not successfully executed.

The success or failure of each DSD to unlock may be logged. For example, when the DSD was successfully unlocked, an entry indicating the DSD was successfully unlocked may be entered into a log, at 623, and the method 600 can include determining if there are more DSDs to unlock, at 632. In some embodiments, the log may be stored in the KMD, in a server memory, in a portable memory, in another memory, or any combination thereof. When the DSD was not successfully unlocked, the method 600 can include entering an entry indicating the DSD was not successfully unlocked into a log of errors, at 624, and providing an error indicator indicating a security error, at 626.

In some embodiments, the method 600 may include providing the OS or a user with an option to stop the server's bootup process in response to a security error, at 630. When the process is elected to be stopped, the bootup process and the method 600 can end, at 628. In some examples, the user may not be provided with an option to continue or stop the bootup process, at 630; rather, the method 600 may automatically end, at 628, determine if there are other DSDs to unlock, at 632, or perform other operations. If the bootup process is ended, at 628, the method 600 can also lock the secure area on the KMD, at 628.

When the bootup process continues, the method 600 can include determining if there are any other registered DSDs or bands to unlock, at 632. In some embodiments, the OS can compare the unique identifiers obtained from the attached DSDs against a list of registered DSDs. If another of the unique identifiers obtained from the attached DSDs corresponds to a unique identifier from the list of registered DSDs, an encrypted key corresponding to another selected unique identifier may be retrieved from the second encrypted area, at 614, and the process can continue as described above. Further, the OS can determine when there are no more registered DSDs to unlock by requesting a registration status, an encrypted status, or both, from the attached DSDs. For example, a command may be sent to each of the attached DSDs to determine if any of the DSDs are still locked, or do not correspond to any unique identifier in the list of registered DSDs.

When all of the DSDs are unlocked, the method 600 can lock the secure areas on the KMD, at 635, and proceed to continue a boot process, at 640. When some of the DSDs are still locked or are not in the list of registered DSDs, the method 600 can lock the secure areas of the KMD, at 635, and then continue with the boot process, at 640.

In some systems, multiple encrypted keys may be obtained from the second secure area at a same time, or in response to a single request. For example, multiple unique identifies from the list of registered DSDs may be utilized in a single request to retrieve encrypted keys, and the LKMS may provide corresponding encrypted keys in a single response.

In some embodiments, an order in which the steps in the method 600 may be changed. For example, in certain embodiments, operation 626 may occur prior to operation 624, or operation 620 may occur after operation 622.

Figure 7:
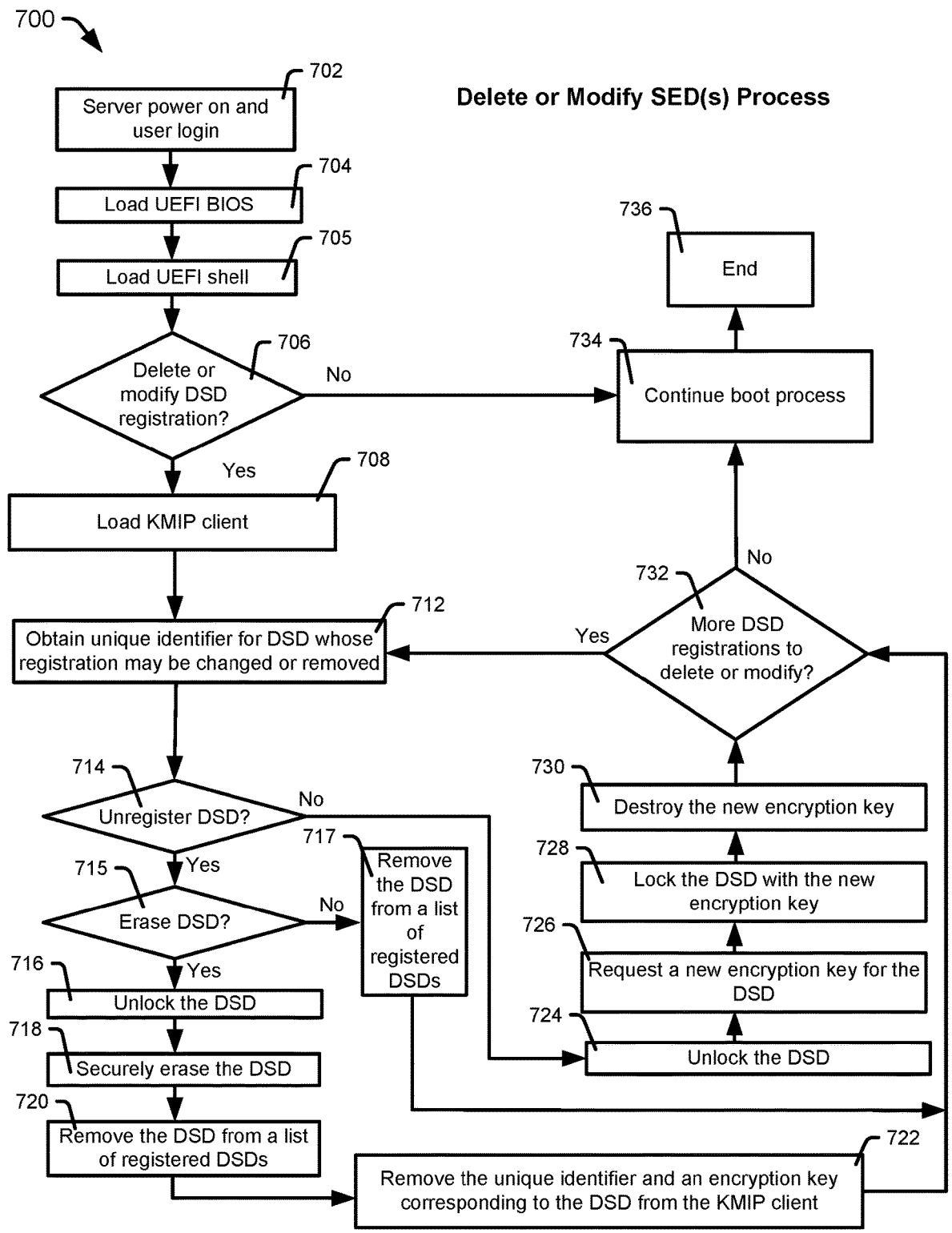
FIG. 7 is a flowchart of a method for a self-contained key management device, in accordance with certain embodiments of the present disclosure.

Referring to FIG. 7, certain embodiments of a method for unlocking stand-alone self-encrypting data storage devices with a removable circuit are shown and generally designated 700. The method 700 may be implemented by the systems 100 and 200, according to certain embodiments. The method 700 can delete or modify DSD registration(s).

The method 700 can include powering on a server, at 702, and loading a UEFI BIOS, at 704. In some embodiments, a UEFI BIOS stored within a KMD can be loaded to run on the server and perform security operations to allow the KMD and server to perform the functions herein. The UEFI BIOS can load a UEFI registration shell, at 705, which can include commands to allow modification or deletion of SEDs from a DIT. When a delete or modify command may be executed, at 706, the method 700 may load a KMIP client into the server memory to be executed to communicate with the LKMS module. Once the KMIP client achieves access to the LKMS, as described herein, the method 500 may obtain an unique identifier for a DSD whose registration may be changed or removed, at 712, such as from a DIT stored in the first secure storage area. In some examples, the KMD or other memory may include a list of DSDs to be unregistered and a list of DSDs whose registration may be changed or updated, and the KMD can select the unique identifier from the lists. The KMD can compare a DSD's unique identifier against a list of DSDs to be unregistered and a list of DSDs whose registration may change or need updating.

The method 700 can include determining if the selected DSD may be updated (e.g. implement a new encryption key but not unregister the DSD), at 714. When the selected DSD is to be updated, the method may unlock the DSD, at 724, determine a new encrypted key for the DSD, such as from a key generation circuit, at 726, receive and lock the DSD with the new encrypted key, at 728, and destroy the old encrypted key at the second secure storage area, at 730. The method may then determine if more DSDs need erasing or updating, at 732. When there are no more DSD registrations to change or remove, the method 700 can include continuing the boot process, at 734, and ending, at 736.

The method 700 can include determining if the DSD to be unregistered can be erased, at 715. In some circumstances, a DSD can be removed without securely erasing the data. In some examples, an erase indicator corresponding to the DSD may be included in the list of DSDs. When the DSD is to be removed (and not erased), the method 700 can include removing the DSD from a list of registered DSDs, at 717, and determining if there are more DSD registrations to erase or modify, at 732.

When the DSD is to be erased, the method 700 can include unlocking the DSD, at 716. The method 700 can include securely erasing the unlocked DSD, at 718. In some embodiments, the DSD may be cryptographically erased. When a DSD is cryptographically erased, an encryption key protecting data of the DSD may be changed, and all record of the encryption key may be destroyed. Thus, any data encrypted by such key on the DSD may not be accessible. In some examples, the DSD may be physically erased using write patterns to continually overwrite the DSD, or a portion thereof, until no physical traces of useful data exist.

Once the DSD has been securely erased, the method 700 can include removing the DSD from a list of registered DSDs, at 720. The list of registered DSDs may be accessed and the unique identifier corresponding to the securely erased DSD may be removed.

The method 700 can then include initiating the LKMS to remove (e.g. delete, erase) the unique identifier and the encrypted key corresponding to the DSD from the second secure storage area, at 722. The LKMS device may delete the encryption key from the second secure storage area.

The method 700 can include determining if there are more DSDs to be unregistered or DSDs whose registration may be changed, at 732. The method may determine if there are any more DSDs in the list of DSDs to unregister and the list of DSDs whose registration may be changed to determine if there are DSDs that have not yet been selected. When there are no more DSD registrations to change or DSDs to erase or remove, the method 700 can include continuing a boot process, at 734, and ending, at 736.

When there are more DSD registrations to change or DSDs to update, erase, or remove, the method 700 may repeat one or more of the steps.

One or more steps in the method 700 may be optional. Further, in some examples, an order in which steps in the method 700 are executed may change. For example, step 722 may be executed before step 720.

Figure 8:
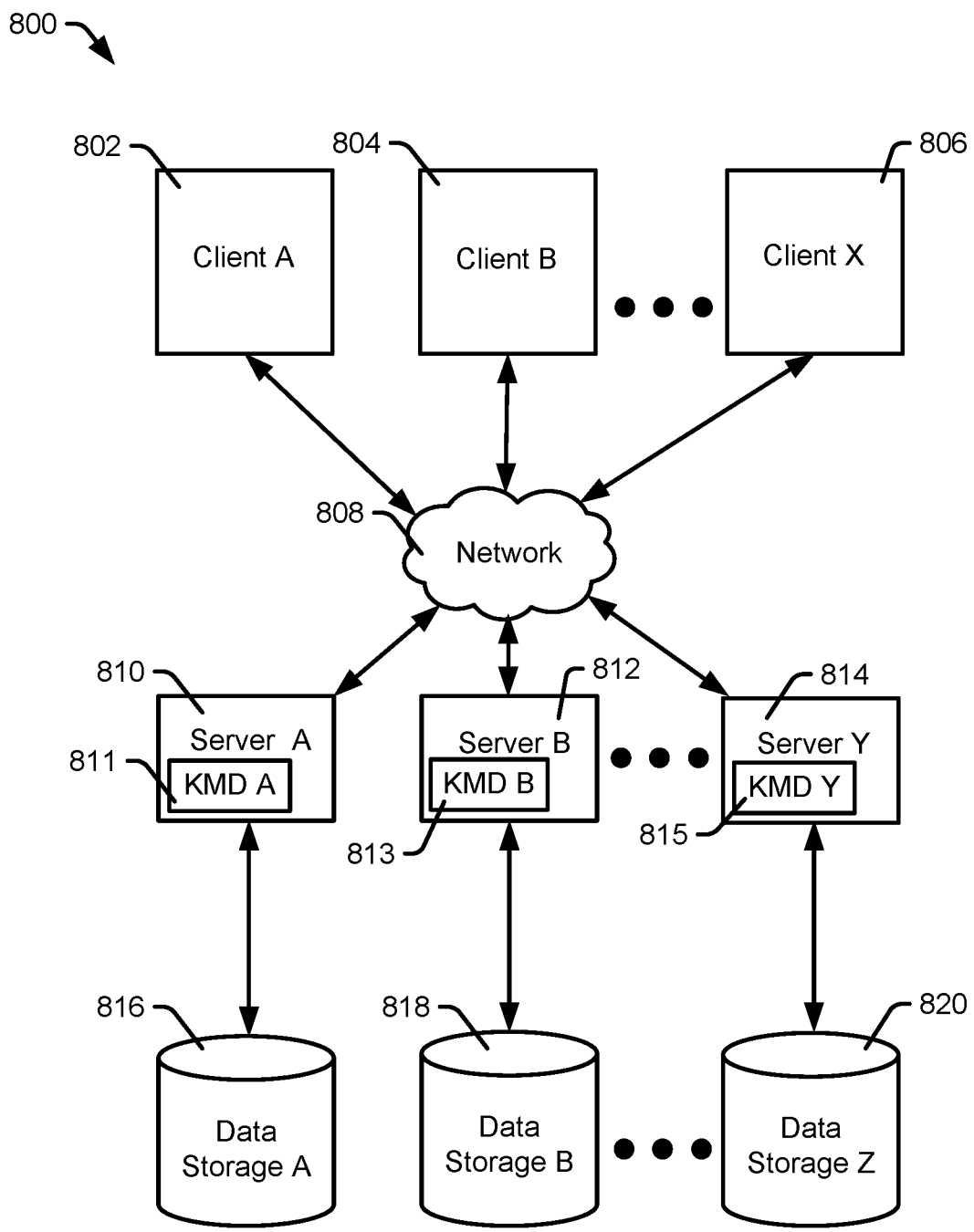
FIG. 8 is a diagram of a system of a self-contained key management device, in accordance with certain embodiments of the present disclosure.

Referring to FIG. 8, certain embodiments of a system of a stand-alone removable circuit for unlocking self-encrypting data storage devices are shown and generally designated 800. The system 800 may be an example of the systems 100 and 200, according to certain embodiments. The system 800 may be an example of a distributed file system, and may implement systems 100 and 200 and 900, and methods 300, 400, 500, 600, and 700, according to certain embodiments.

The distributed file system can allow one or more client nodes (e.g. A 802, B 804, and X 806) to access data in arrays of data storage (e.g. A 816, B 818, and Y 820) via a network 808. Servers A 810, B 812, and Y 814 can include KMDs A 811, B 813, and Y 815 may be coupled to the arrays of data storage A 816, B 818, and Z 820, respectively. In some examples, servers A 810, B 812, and Y 814 may store data to, or obtain data from, the arrays of data storage A 816, B 818, and Z 820 in response to client requests.

A KMD in one server may be communicatively coupled with data storage in other servers, and may manage the access functions thereof. In some examples, the KMD 811 in server A 810 may be communicatively coupled to data storage 818, and the KMD 811 can manage the certificates and access of data storage 818.

In some examples, when the clients A 802, B 804, or X 806, want to store or obtain data, a file system operation request may be transmitted to one or more of the servers A 810, B 812, and Y 814 via the network 808. The servers A 810, B 812, and Y 814 may store all or part of the data to their corresponding data arrays of storage. In some cases, servers A 810, B 812, and Y 814 may be file system servers, metadata servers, or other servers.

Figure 9:
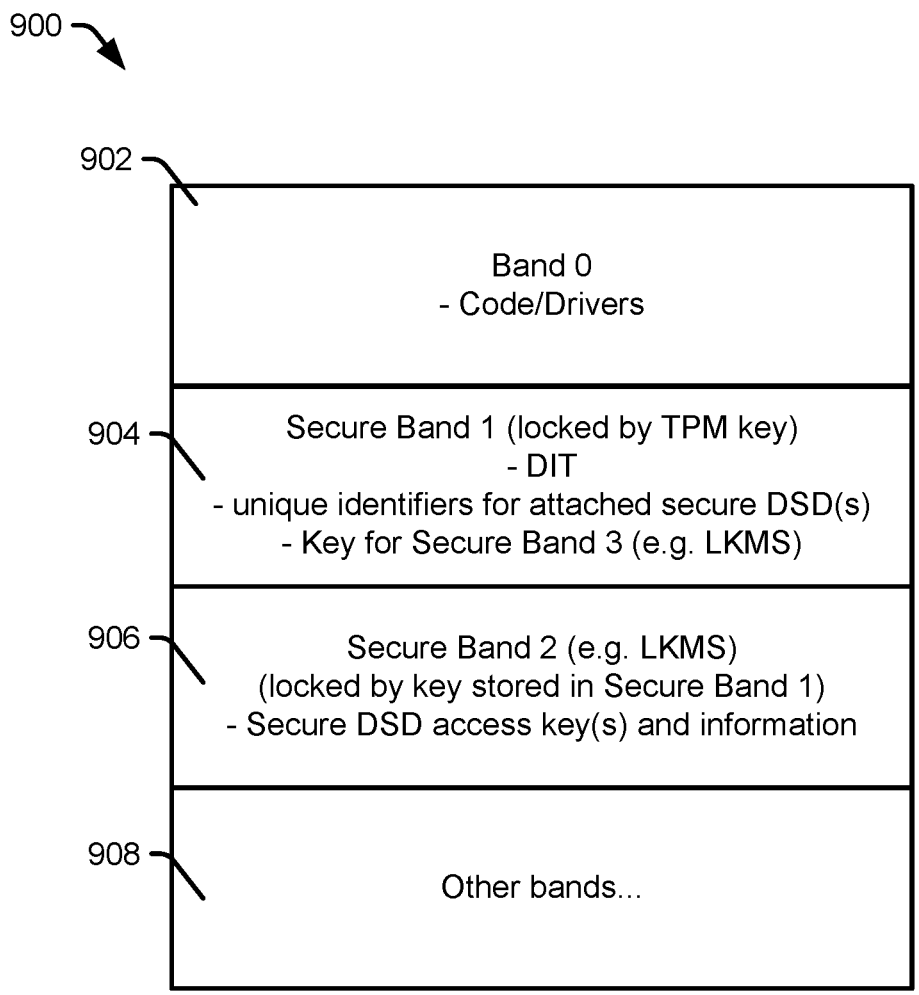
FIG. 9 is a diagram of a system of a self-contained key management device, in accordance with certain embodiments of the present disclosure.

Referring to FIG. 9, certain embodiments of a stand-alone system of a removable circuit for unlocking self-encrypting data storage devices are shown and generally designated 900. System 900 is a representative drawing of logically organized areas of a data storage device's memory that can be utilized as KMD. The data storage memory may be divided into multiple bands, or reserved logical areas, such as Band 0 902, Band 1 904, Band 2 906, and other bands 908.

Band 0 902 may be utilized to store an operating system code that can be loaded to run in a host server system. Band 1 904 may be utilized to store a DIT, unique identifiers for SEDs attached to a KMD's host, one or more keys to access another band, or any combination thereof. In some instances, the unique identifiers may be stored in the DIT or may be separately stored information. Band 1 904 may be encrypted by a TPM of a host, thus the data in the band may be unusable unless the KMD having the memory is communicating with the proper host having the associated TPM. Band 2 906 may store key(s) to allow the host to access SEDs of the server. Band 3 906 may also be encrypted, though may be encrypted with key stored in band 1 904.

Figure 10:
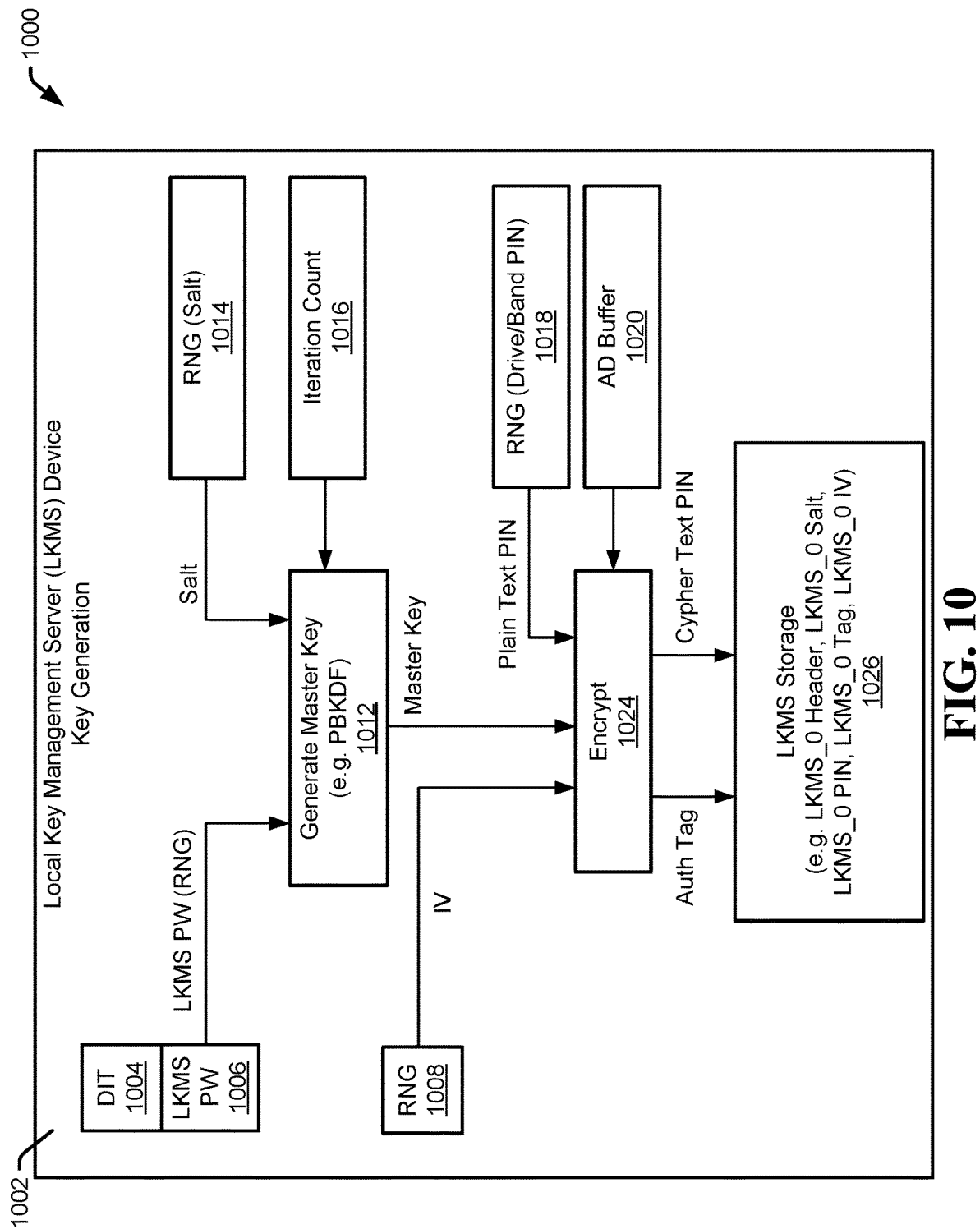
FIG. 10 is a diagram of a system of a self-contained key management device, in accordance with certain embodiments of the present disclosure.

Referring to FIG. 10, certain embodiments of a system of a removable circuit for unlocking self-encrypting data storage devices are shown and generally designated 1000. The system 1000 can include a LKMS device 1002 configured to generate a local key to lock a security enhanced data storage device, such as a self-encrypting drive (SED); thus, the system 1000 may be utilized with the others systems described herein. The LKMS device 1002 can be a controller, circuit, software, or a combination thereof that performs the functions of the LKMS device.

The LKMS device 1002 may be activated when a host system, such as server 202, is attempting to initialize an SED. The LKMS device 1002 may generate an encryption key or related information to be stored to a secure storage area 1026 of the LKMS storage device 1002, such as a lockable band or zone. A master key generation circuit 1012 may generate a master key based on an LKMS password from a generation circuit 1006, which may include a random number generator circuit; the LKMS password may be associated with a specific drive or band in a DIT 1004. The master key generation circuit 1012 may also receive a salt value from a random number generator circuit 1014 and receive an iteration count value from an iteration circuit 1016.

The LKMS device 1002 may generate the master key by utilizing a key generation circuit 1012. An example of a key generation that can be utilized may be a password-based key derivation function (PBKDF), such as PBKDF 2. The PBKDF may be a cryptographic hash or cipher that utilizes the salt value and repeats the process a number times based on the iteration count value to produce the master key based on the LKMS password. The iteration counter circuit 1016 may set the number of iterations for the key generation circuit, which may be constant or varied between different SEDs. However, the iteration count for a specific SED must be known in order to regenerate the master key relative to that specific SED, as the master key will need to be regenerated to access the SED. The master key is preferably never stored in a memory outside of the LKMS device 1002. Further, any other password hash function may be used to generate the master key.

Once the LKMS device 1002 has the master key generated, it may pass the master key to the encryption circuit 1024. The encryption circuit 1024 may receive an initialization value (IV) from a random number generator (RNG) circuit 1008 (or from a memory if the IV value is already stored) and receive an LKMS PIN, which can be a plain text personal identification number assigned to the specific SED that may be generated by a random number generator circuit 1018. The AD buffer 1020 may be used to store additional or auxiliary information such as other parameters that system or user could choose to combine with the master key to generate the cypher text PIN. The encryption circuit 1024 may use the master key, the IV, other information from the AD buffer, the plain text PIN, or any combination thereof, to generate a cypher text PIN associated with a specific secure area of a data storage device, such as a locked band or drive. The cypher text PIN and the respective IV may be stored to an array of the lockable band of the LKMS storage device.

The encryption circuit 1024 can generate an encrypted PIN and store the encrypted PIN in the LKMS secure storage area 1026. The encryption circuit 1024 can also generate an LKMS tag (e.g. authorization tag), which can be a set of information unique to an SED. The encryption circuit 1024 can also store the salt value, a header, and the LKMS tag to the LKMS secure storage area 1026. Some or all of the information may be stored in a secure band, such as the third band shown in FIG. 9.

The circuit 1000 may produce an LKMS tag and LKMS cypher text PIN for each encrypted storage area the LKMS system is managing. The information for each may be stored in an array in a secure storage area, such as the third band shown in FIG. 9. Thus, the process and circuits described with respect to the system 1000 may run for each unique secure storage area related to the LKMS. For example, LKMS_0 Header, LKMS_0 Salt, LKMS_0 PIN, LKMS_0 Tag, LKMS_0 IV may be stored for a first secure area or drive, where LKMS_1 Header, LKMS_1 Salt, LKMS_1 PIN, LKMS_1 Tag, LKMS_1 IV may be stored for a second secure area, and so on.

Figure 11:
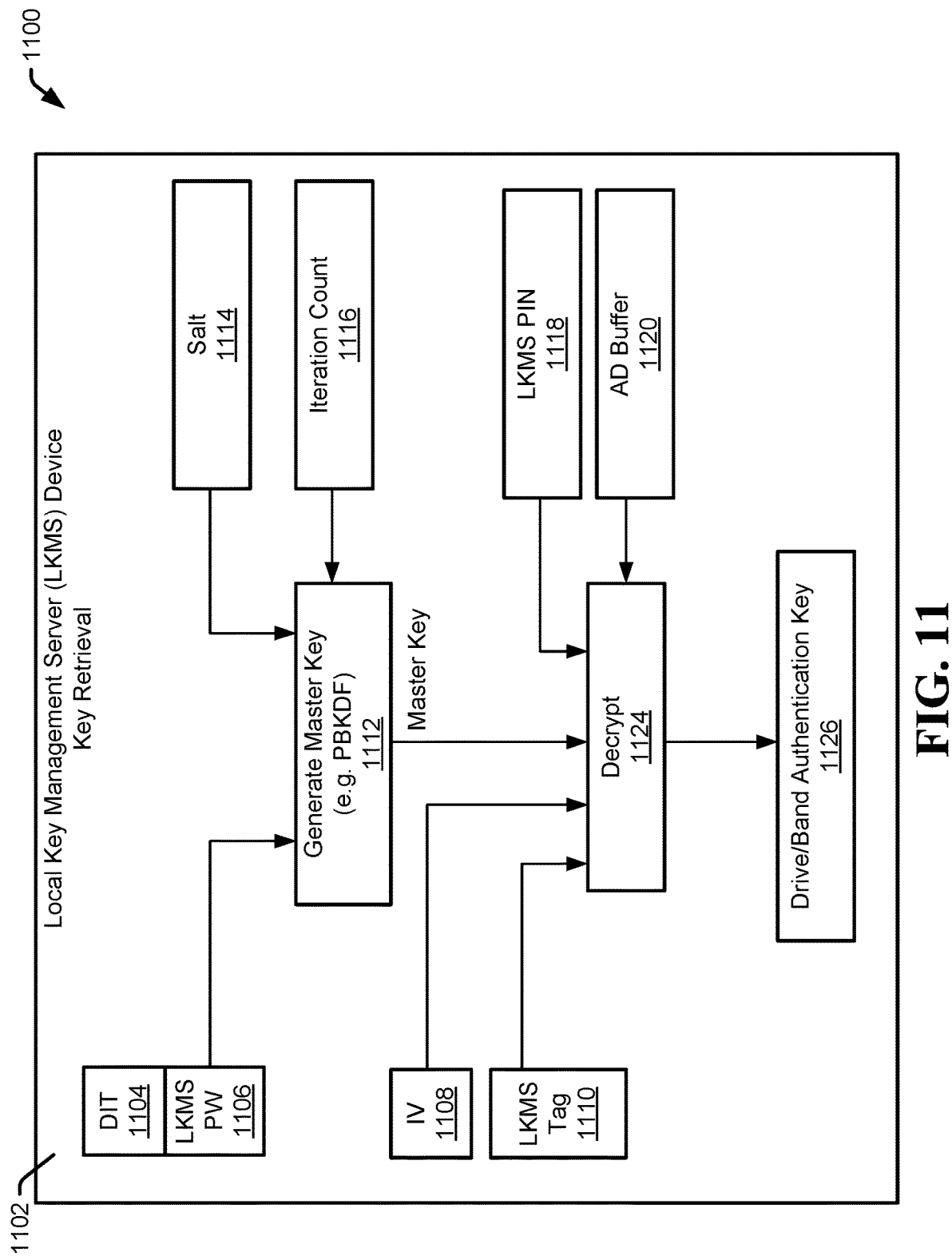
FIG. 11 is a diagram of a system of a self-contained key management device, in accordance with certain embodiments of the present disclosure.

Referring to FIG. 11, certain embodiments of a system of a removable circuit for unlocking self-encrypting data storage devices are shown and generally designated 1100. The system 1100 can include a LKMS device 1102 configured to retrieve a local key to unlock a security enhanced data storage device, such as a self-encrypting drive (SED); thus, the system 1100 may be utilized with the others systems described herein. The LKMS device 1102 can be a controller, circuit, software, or a combination thereof that performs the functions of the LKMS device.

The LKMS device 1102 may be activated when a host system, such as server 202, is attempting to access an SED. The LKMS device 1102 may generate a master key from an LKMS password 1106 associated with a secure area listed in a drive information table (DIT) 1104, a random number generator salt value from a random number generator circuit 1114, and an iteration count value from a counter circuit 1116. The salt value may be associated with the specific SED that is attempting to be accessed. Also, the counter 1116 may provide an iteration count, which may be a constant value associated with a specific SED.

The LKMS device 1102 may generate the master key by utilizing a key generation circuit 1112. An example of a key generation that can be utilized may be a password-based key derivation function (PBKDF), such as PBKDF 2. The PBKDF may be a cryptographic hash or cipher that utilizes the salt value and repeats the process a number times based on the iteration count value to produce the master key. The iteration counter circuit 1116 may set the number of iterations for the key generation circuit, which may be constant or varied between different SEDs. However, the iteration count for a specific SED must be known in order to generate the master key relative to that specific SED, otherwise the master key may not be able to be decrypted to access the SED. Further, any other password hash function may be used to determine the master key.

Once the LKMS device 1102 has the master key generated, it may pass the master key to the decryption circuit 1124. The decryption circuit 1124 may receive an initialization value 1108, an LKMS tag 1110, and an LKMS PIN (cypher text), which can be a cypher text personal identification number assigned to the specific SED. The authorization value may be a value or key received from the TPM that indicates to the decryption circuit that it is allowed to perform the decryption. The LKMS PIN, LKMS IV, and LKMS tag may be retrieved from a locked band of the LKMS storage device, where the locked band was previously unlocked via the TPM or another key.

The decryption circuit 1924 may utilize the LKMS tag, the initialization value, the LKMS PIN, and the AD buffer 1120 information in conjunction with the master key to generate a plain text PIN that represents a drive authentication key for a specific SED. The decryption circuit may perform a reverse hash utilizing the received values and keys to generate the plain text PIN. The LKMS device 1102 can then pass the plain text PIN to a connected host, which can then utilize that PIN to unlock a specific SED or secure area.

The process described with respect to the system 1100 may be utilized for each instance of a secure storage area stored in an array of information. For example, as shown in FIG. 9, secure band 3 906 may store an array of the information needed for the system 1100 to determine a plain text PIN corresponding to each secure area related to the LKMS 1102. In some examples, there may be hundreds or thousands of secure areas for which information is stored in the array; thus, the process of system 1102 would need to operate once for each area that is to be unlocked.

The devices, systems, and methods described herein can be implemented as stand-alone circuits or devices that are able to operate independently of other hardware or software. For example, a KMD (e.g. 108 or 212) may be a stand-alone circuit or device that utilizes an internal LKMS (e.g. 102 or 204) to implement the security processes described herein rather than utilizing a different LKMS that is at a different device. The stand-alone KMD can manage the security processes described herein independently of the host, e.g. independent of the host OS and host BIOS, such as the processes for locking or unlocking of SEDs.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
 a data storage device configured to:
  connect to be removable from a first server;
  load an unified extensible firmware interface ("UEFI") basic input/output system ("BIOS") stored locally in the data storage device into the memory of the first server and executed at the first server, the UEFI BIOS configured to:
   unlock a first secure area of the data storage device;
   retrieve a first access key from the first secure area;
   unlock a second secure area of the data storage device with the first access key;
   retrieve a second access key from the second secure area; and
   unlock a secure storage area of another data storage device with the second access key.

2. The apparatus of claim 1 further comprising:
 the UEFI BIOS configured to:
  retrieve a drive information table (DIT) from the first secure area;
  determine a unique identifier corresponding to the DSD; and
  request the second access key based on the unique identifier.

3. The apparatus of claim 2 further comprising:
 the UEFI BIOS configured to execute a key management module configured to access a hardware encryption circuit of the first server;
 the UEFI BIOS configured to:
  connect to be removable from the first server by a physical and electrical connection to the first server which allows the data storage device to be removed from the first server without physically modifying the first server; and
 the data storage device further including:
  an interface circuit;
  a memory configured to store the UEFI BIOS; and
  a controller configured to manage the loading of the UEFI BIOS into the memory of the first server.

4. The apparatus of claim 1 further comprising:
 the UEFI BIOS configured to:
  access an encrypted hardware circuit of the first server;
  obtain access to the first secure area of the data storage device via the encrypted hardware circuit; and
  retrieve the first key from the first secure area when access is granted to the UEFI BIOS.

5. The apparatus of claim 1 further comprising:
 the UEFI BIOS configured to:
  determine if there is an unregistered DSD coupled to the first server, where an unregistered DSD is a DSD that does not have a corresponding key stored in the second server;
  obtain a unique identifier from the unregistered DSD;
  generate an encryption key based on the unique identifier;
  lock the unregistered DSD with the encryption key; and
  store the encryption key in the second secure area.

6. The apparatus of claim 1 further comprising:
 the UEFI BIOS configured to:
  determine if there is a registered DSD to be unregistered coupled to the first server;
  obtain a unique identifier from the registered DSD to be unregistered;
  retrieve an encryption key from the second secure area based on the unique identifier;
  unlock the registered DSD to be unregistered with the encryption key;
  erase the unregistered DSD; and
  delete the unique identifier and the encryption key from the second secure area.

7. The apparatus of claim 1 further comprising:
 the UEFI BIOS configured to:
  determine if there is a DSD registration to modify corresponding to a DSD coupled to the first server;
  obtain a unique identifier from the DSD;
  retrieve an encryption key from the second secure area based on the unique identifier;
  unlock the DSD with the encryption key;
  generate a different encryption key associated with the unique identifier;
  lock the DSD with the different encryption key; and
  store the different encryption key in the second secure area.

8. A memory device storing instructions that when executed cause a processor to perform a method comprising:
 loading a unified extensible firmware interface ("UEFI") basic input/output system ("BIOS") and a key management module from a removable storage device to a server memory;
 executing the UEFI BIOS at the server to unlock a self-encrypting drive (SED) attached to the server;
 executing the key management module at the server to access a local key management server (LKMS) on the removable storage device;
 receiving a key from the LKMS at the UEFI BIOS; and
 unlocking the SED based on the key.

9. The memory device of claim 8 further comprising executing the key management module includes retrieving a drive information table stored within a first secure nonvolatile data storage area, the drive information table identifying whether data storage devices are registered and have a corresponding key.

10. The memory device of claim 9 further comprising the method including implementing an automatic registration mode when a data storage device is detected that does not have a key registered in the drive information table.

* * * * *